United States Patent
Une et al.

(10) Patent No.: US 10,225,563 B2
(45) Date of Patent: Mar. 5, 2019

(54) IMAGE ENCODER, IMAGE DECODER, AND IMAGE TRANSMISSION DEVICE

(71) Applicant: Renesas Electronics Corporation, Koutou-ku, Tokyo (JP)

(72) Inventors: Tomohiro Une, Tokyo (JP); Takahiko Sugimoto, Tokyo (JP); Kwangsoo Park, Tokyo (JP); Toshiyuki Kaya, Tokyo (JP); Tetsuya Shibayama, Tokyo (JP); Seiji Mochizuki, Tokyo (JP)

(73) Assignee: Renesas Electronics Corporation, Tokyo ( * ) Notice: Subject to any disclaimer, the term of this patent is extended or adjusted under 35 U.S.C. 154(b) by 264 days.

(21) Appl. No.: 15/206,248

(22) Filed: Jul. 9, 2016

(65) Prior Publication Data

US 2017/0064312 A1    Mar. 2, 2017

(30) Foreign Application Priority Data

Aug. 31, 2015  (JP) ................................ 2015-170138

(51) Int. Cl.
| | |
|---|---|
| *G06K 9/00* | (2006.01) |
| *H04N 19/186* | (2014.01) |
| *H04N 19/117* | (2014.01) |
| *H04N 19/80* | (2014.01) |
| *H04N 19/36* | (2014.01) |

(52) U.S. Cl.
CPC ......... *H04N 19/186* (2014.11); *H04N 19/117* (2014.11); *H04N 19/36* (2014.11); *H04N 19/80* (2014.11)

(58) Field of Classification Search
CPC .... H04N 19/186; H04N 19/36; H04N 19/117; H04N 19/80
See application file for complete search history.

(56) References Cited

U.S. PATENT DOCUMENTS

| | | | | | |
|---|---|---|---|---|---|
| 5,444,461 | A | * | 8/1995 | Oz ........................... | G09G 5/02 345/605 |
| 5,450,098 | A | * | 9/1995 | Oz ........................... | G09G 5/02 345/605 |

(Continued)

FOREIGN PATENT DOCUMENTS

JP        2004-015226 A        1/2004

*Primary Examiner* — Aaron W Carter
(74) *Attorney, Agent, or Firm* — Shapiro, Gabor and Rosenberger, PLLC

(57) ABSTRACT

Making effective use of an image encoder and an image decoder for processing a color image of a general-purpose standard bit depth, an image transmission device capable of transmitting/receiving a monochrome image of a higher bit depth is configured. An image transmission device includes an image encoder to encode a high bit-depth monochrome image and output encoded data and an image decoder to generate, by decoding the encoded data received via a transmission path, a high bit-depth monochrome image. The image encoder decomposes the input high bit-depth image data into plural bit planes corresponding to color image data of a standard bit depth and encodes the standard bit-depth color image data. The image decoder decodes the color image data of the standard bit depth and synthesizes, from the decoded standard bit-depth color image data, a high bit-depth monochrome image.

16 Claims, 12 Drawing Sheets

(56) References Cited

U.S. PATENT DOCUMENTS

| | | | | |
|---|---|---|---|---|
| 6,208,761 B1* | 3/2001 | Passaggio | H04N 19/503 375/E7.026 |
| 2003/0063810 A1* | 4/2003 | Chebil | H04N 19/15 382/240 |
| 2004/0252891 A1* | 12/2004 | Sasaki | G09G 3/3688 382/232 |
| 2008/0123736 A1* | 5/2008 | Sekiguchi | H04N 19/176 375/240.01 |
| 2008/0123737 A1* | 5/2008 | Sekiguchi | H04N 19/70 375/240.01 |
| 2008/0123972 A1* | 5/2008 | Sekiguchi | H04N 21/236 382/232 |
| 2008/0130740 A1* | 6/2008 | Sekiguchi | H04N 19/176 375/240.01 |
| 2008/0130756 A1* | 6/2008 | Sekiguchi | H04N 19/176 375/240.24 |
| 2008/0137731 A1* | 6/2008 | Sekiguchi | H04N 19/176 375/240.01 |
| 2008/0137732 A1* | 6/2008 | Sekiguchi | H04N 19/00 375/240.01 |
| 2009/0040234 A1* | 2/2009 | Kobayashi | G09G 5/02 345/604 |
| 2009/0074052 A1* | 3/2009 | Fukuhara | H04N 19/63 375/240.01 |
| 2009/0092326 A1* | 4/2009 | Fukuhara | H04N 19/139 382/233 |
| 2012/0328192 A1* | 12/2012 | Fukuhara | H04N 19/597 382/166 |
| 2013/0004072 A1* | 1/2013 | Liu | H04N 19/154 382/173 |
| 2015/0124863 A1* | 5/2015 | Ben Natan | H04N 1/646 375/240.02 |
| 2017/0064312 A1* | 3/2017 | Une | H04N 19/186 |
| 2018/0124289 A1* | 5/2018 | Maurice | H04N 1/646 |

* cited by examiner

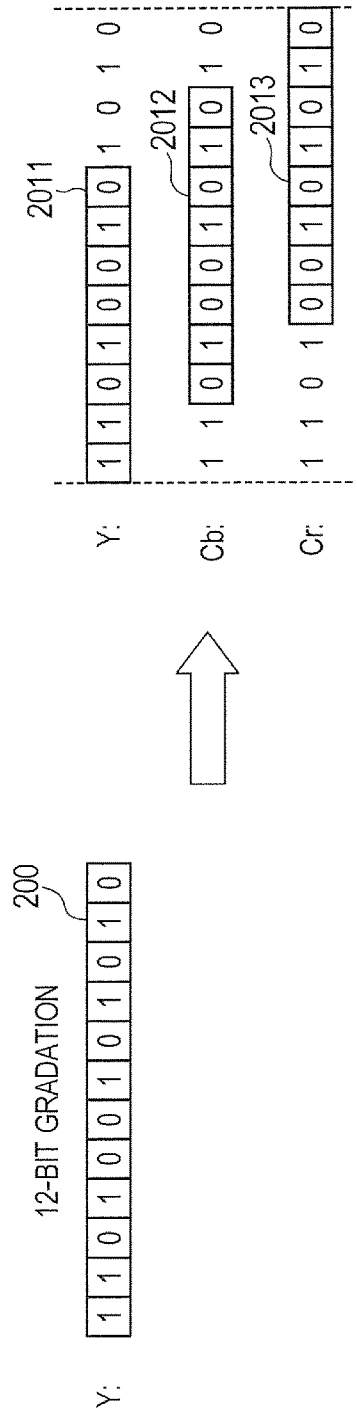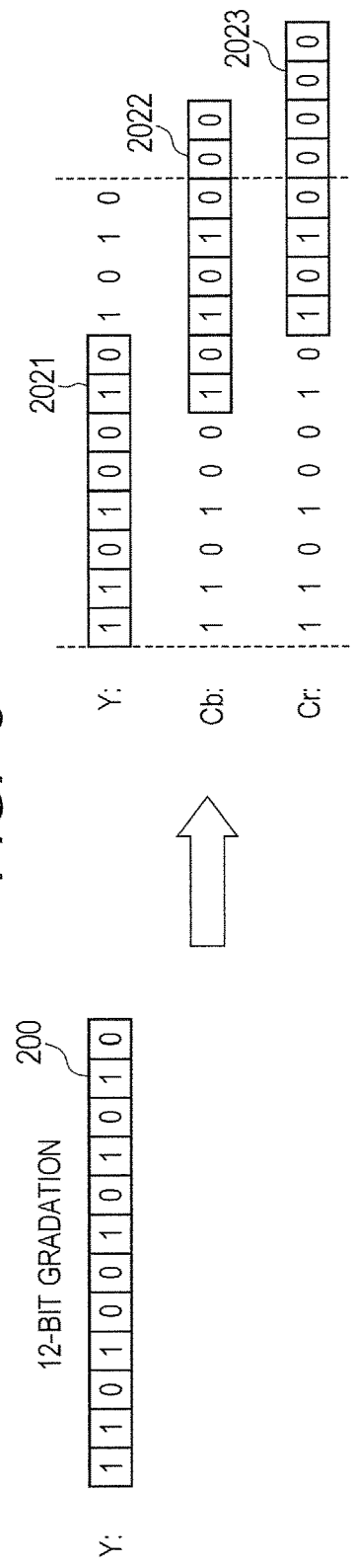

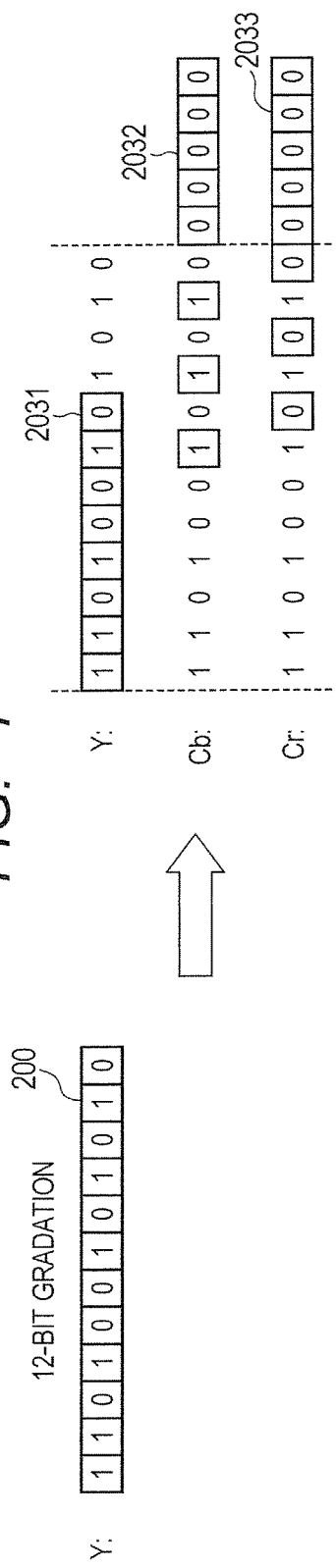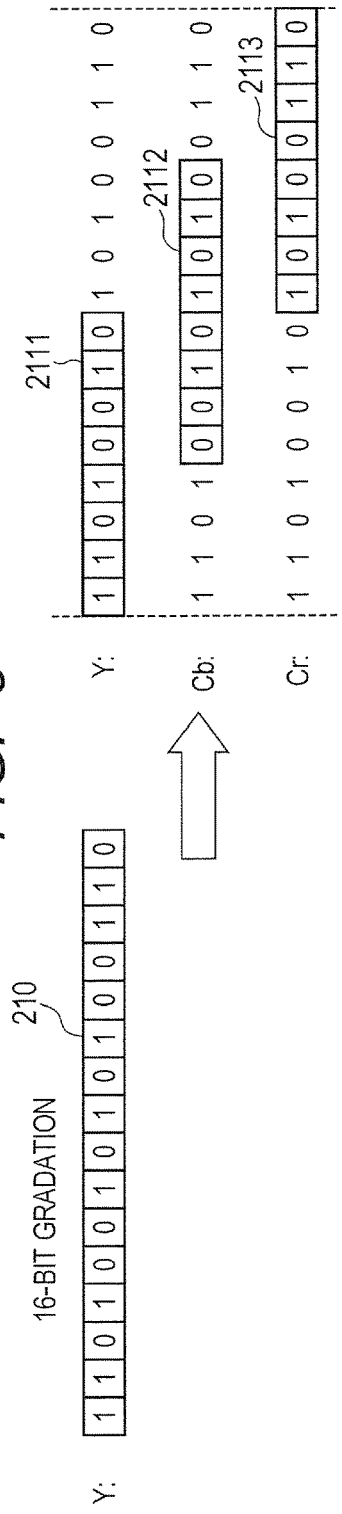

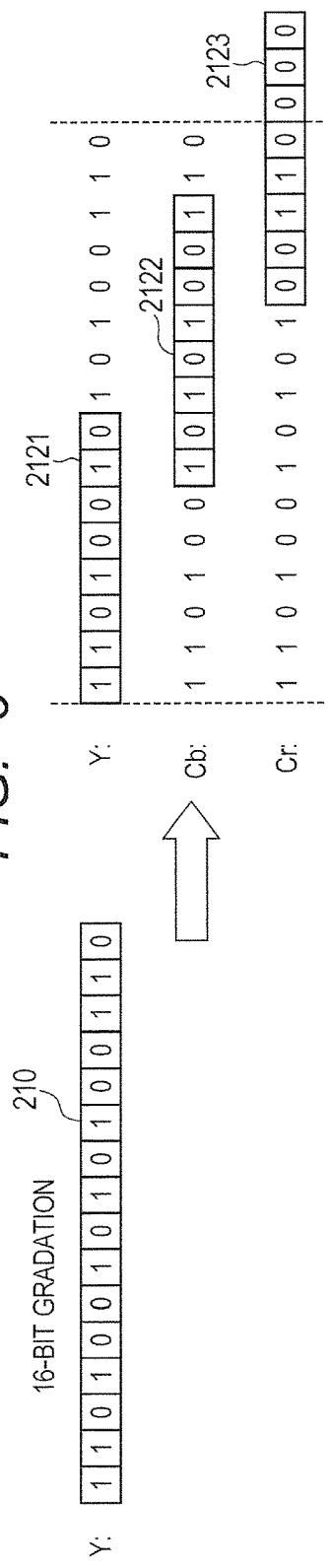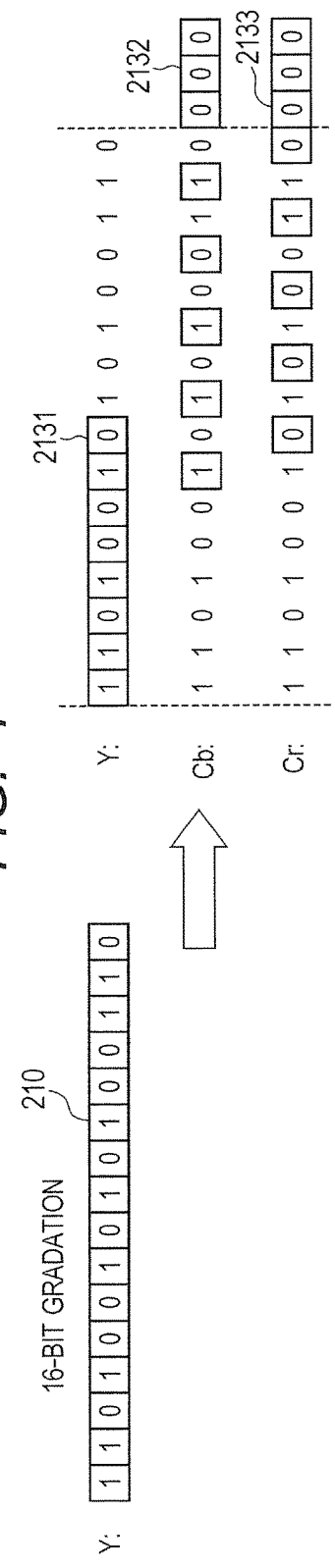

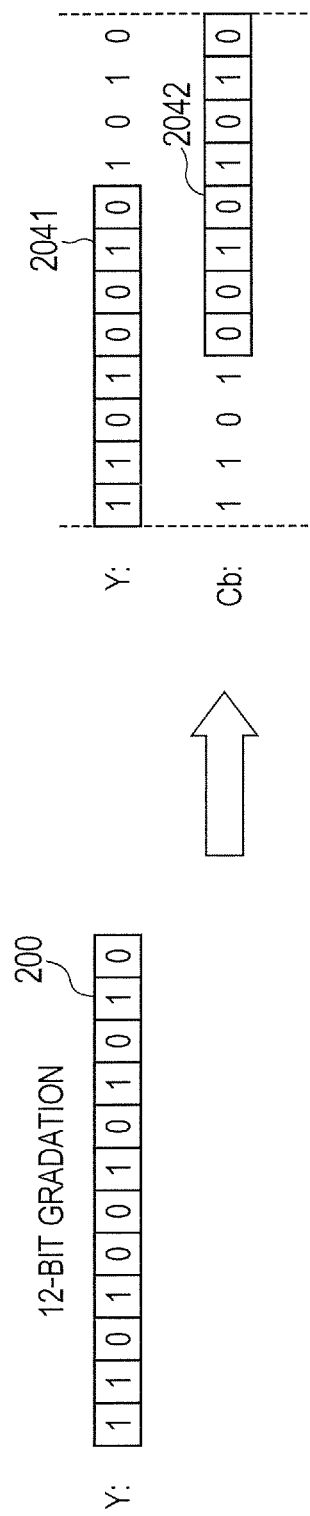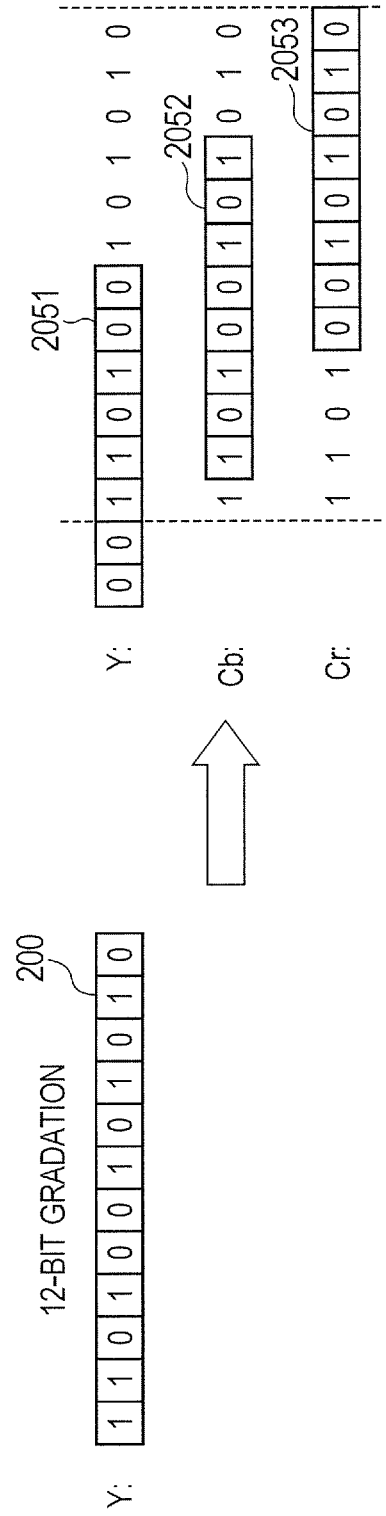

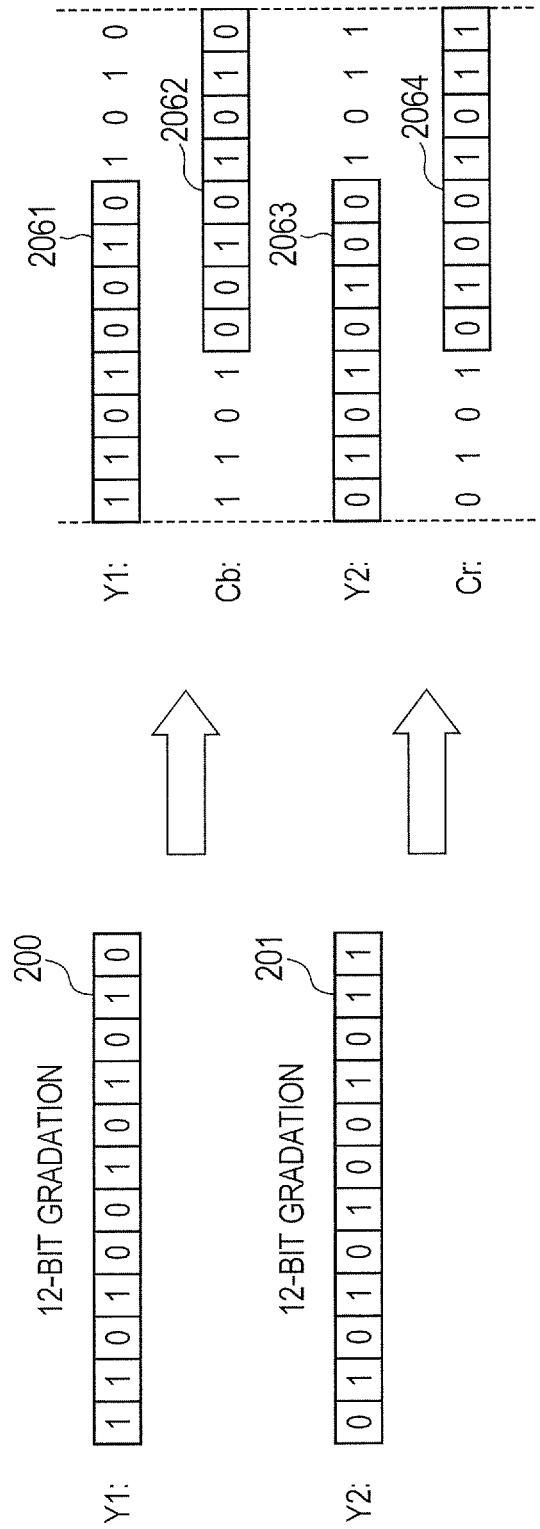

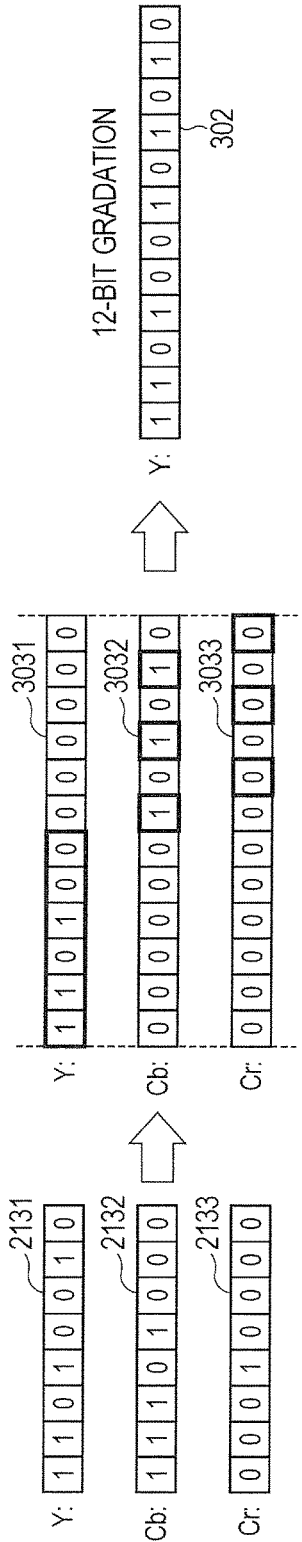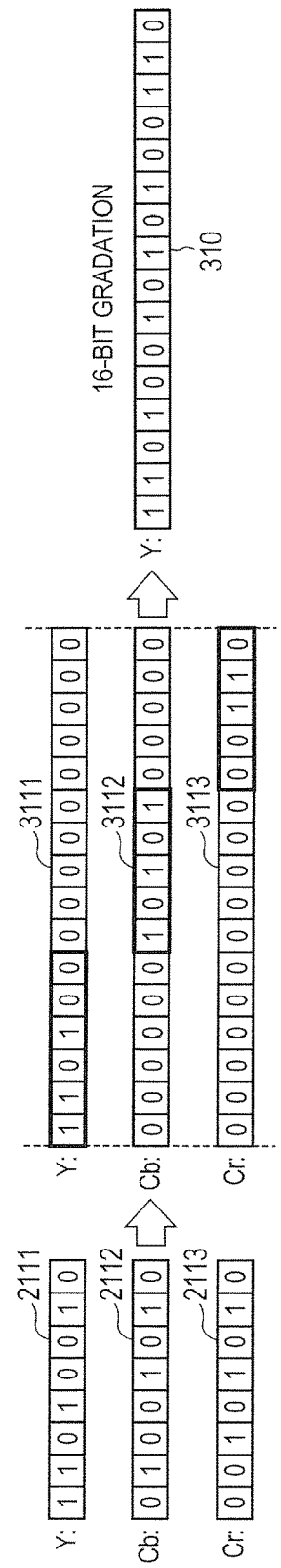

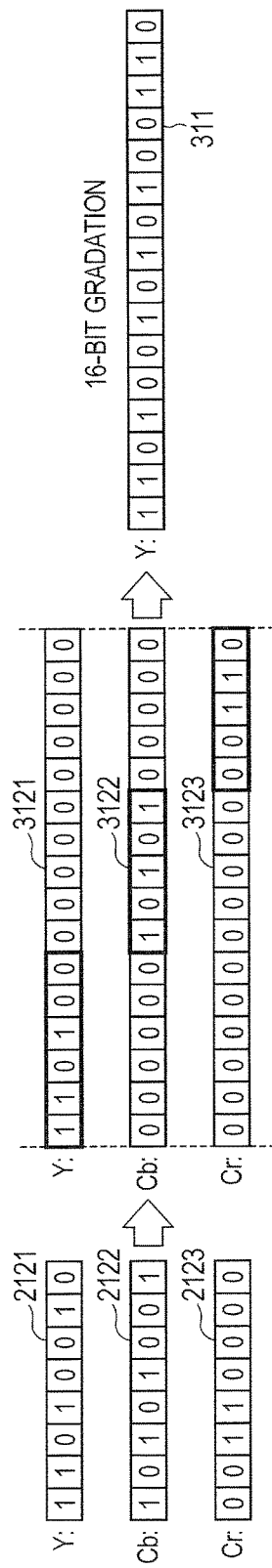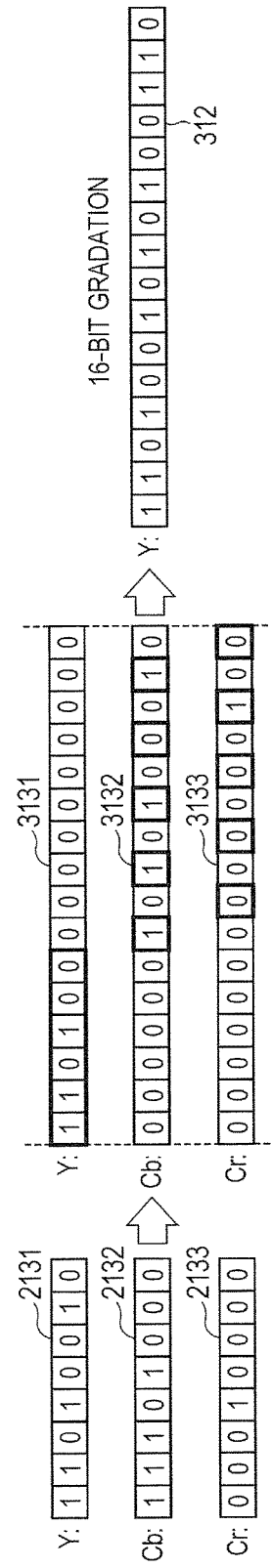

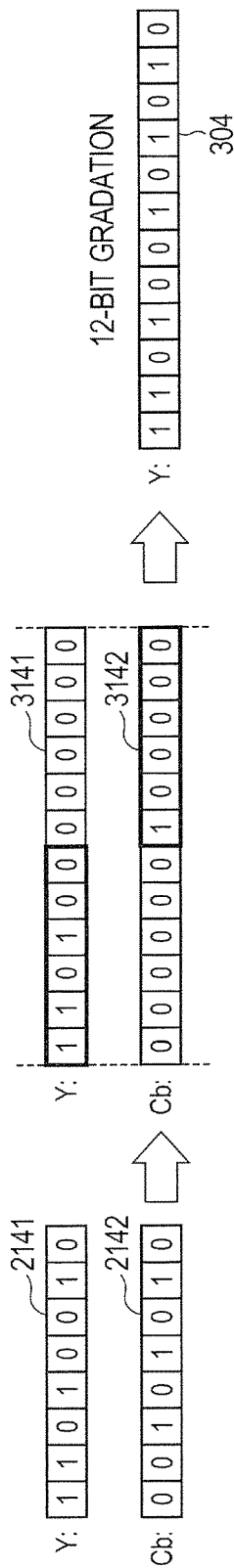
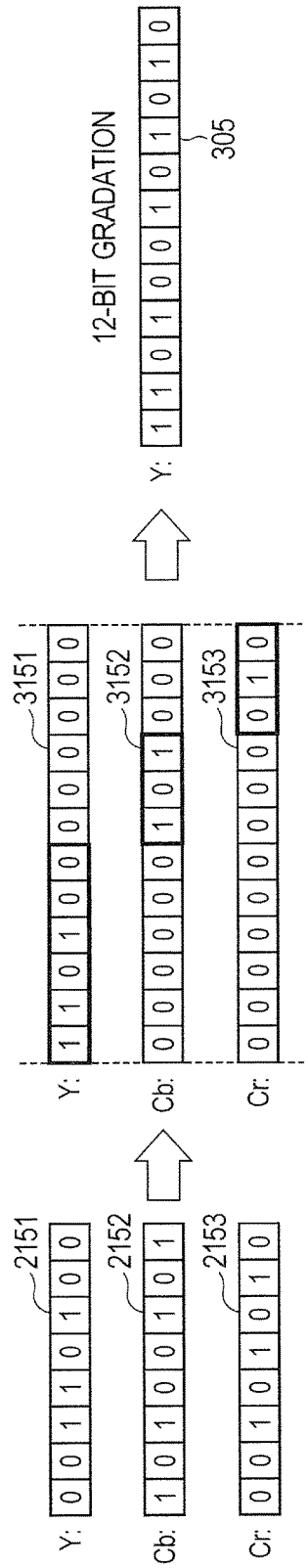

IMAGE ENCODER, IMAGE DECODER, AND IMAGE TRANSMISSION DEVICE

CROSS-REFERENCE TO RELATED APPLICATIONS

The disclosure of Japanese Patent Application No. 2015-170138 filed on Aug. 31, 2015 including the specification, drawings and abstract is incorporated herein by reference in its entirety.

BACKGROUND

The present invention relates to an image encoder, an image decoder and an image transmission device, particularly, to those suitably applicable to image transmission involving encoding and decoding of a monochrome image of a high bit depth.

Image data processed in widely used image encoders and decoders and in image transmission devices making use of such image encoders and decoders is, in many cases, of 8-bit precision per pixel. On the other hand, there are cases in which monochrome image information used, for example, in medical applications, monitoring cameras, and vehicle-mounted distance sensors requires higher-bit precision. Such monochrome images are referred to as high bit-depth monochrome images.

In Japanese Unexamined Patent Application Publication No. 2004-15226, an image encoder and an image decoder are disclosed which, having a simple configuration, process high-gradation image data (high bit-depth image data). In the image encoder and the image decoder, high-gradation image data is processed using basic image encoding means and basic image decoding means for processing 8-bit image data. In the image encoder disclosed in the above patent literature, a bit plane comprised of high-order 8 bits of an original high-gradation image is encoded, as a basic image, by basic image encoding means. In the image encoder, the output of the encoded image is decoded using basic image decoding means. The image data obtained by internally performed decoding is shifted left by a required number of bits, then the difference between the original image and the left-shifted image data is encoded again by the basic image encoding means. In this way, high-gradation image data can be processed using the basic image encoding means and basic image decoding means for processing 8-bit image data.

SUMMARY

As a result of examining the above patent literature, the present inventors have found the following problems.

To encode an original image, it is necessary to sequentially perform encoding processing, decoding processing and again encoding processing using basic image encoding means and basic image decoding means for processing 8-bit image data. This involves a large delay in processing an image and increases power consumption by the devices used.

How to address the above problems will be described in the following. Other objects and novel features of the present invention will become apparent from the description of this specification and attached drawings.

An embodiment of the present invention is outlined below.

An image transmission device includes an image encoder to encode a high bit-depth monochrome image received as input data and output encoded data and an image decoder to generate, by decoding the encoded data received via a transmission path, a monochrome image of the high bit depth as output data. The image encoder and the image decoder are configured as follows.

The image encoder has an encoding unit to encode color image data of a standard bit depth smaller than the high bit depth and a data decomposition unit to generate, form the input data, bit planes corresponding to the standard bit-depth color image data.

The image decoder has a decoding unit which performs image decoding processing to decode color image data of the standard bit depth, the image decoding processing corresponding to the image encoding processing by the encoding unit, and a data synthesis unit to generate, from the decoded color image data of the standard bit depth, a high bit-depth monochrome image as output data.

The advantageous effect of the above embodiment is outlined below.

An image transmission device capable of transmitting/receiving a high bit-depth monochrome image can be configured making effective use of an image encoder and an image decoder for processing a color image of a general-purpose standard bit depth.

BRIEF DESCRIPTION OF THE DRAWINGS

FIG. 2 illustrates a first method of decomposing monochrome image data of 12-bit gradation into color image components in YUV 444 format of 8-bit gradation.

FIG. 3 illustrates a second method of decomposing monochrome image data of 12-bit gradation into color image components in YUV 444 format of 8-bit gradation.

FIG. 4 illustrates a third method of decomposing monochrome image data of 12-bit gradation into color image components in YUV 444 format of 8-bit gradation.

FIG. 5 illustrates a first method of decomposing monochrome image data of 16-bit gradation into color image components in YUV 444 format of 8-bit gradation.

FIG. 6 illustrates a second method of decomposing monochrome image data of 16-bit gradation into color image components in YUV 444 format of 8-bit gradation.

FIG. 7 illustrates a third method of decomposing monochrome image data of 16-bit gradation into color image components in YUV 444 format of 8-bit gradation.

FIG. 8 illustrates a method of decomposing monochrome image data of 12-bit gradation into 8-bit gradation color image components, i.e. a luminance Y and a color difference component U (Cb).

FIG. 9 illustrates another method (0's are padded to the high order side of a luminance Y) of decomposing monochrome image data of 12-bit gradation into color image components in YUV444 format of 8-bit gradation.

FIG. 10 illustrates a method of decomposing monochrome image data of 12-bit gradation into color image components in YUV422 format.

FIG. 14 illustrates a third method of synthesizing 12-bit gradation monochrome image data from 8-bit gradation color image components in YUV 444 format.

FIG. 15 illustrates a first method of synthesizing 16-bit gradation monochrome image data from 8-bit gradation color image components in YUV 444 format.

FIG. 16 illustrates a second method of synthesizing 16-bit gradation monochrome image data from 8-bit gradation color image components in YUV 444 format.

FIG. 17 illustrates a third method of synthesizing 16-bit gradation monochrome image data from 8-bit gradation color image components in YUV 444 format.

FIG. 18 illustrates a method of synthesizing 12-bit gradation monochrome image data from 8-bit gradation color image components, i.e. a luminance Y and a color difference component U (Cb).

FIG. 19 illustrates a method of synthesizing 12-bit gradation monochrome image data from 8-bit gradation color image components in YUV444 format with 0's padded to the high-order side of a luminance Y component.

DETAILED DESCRIPTION

Figure 1:
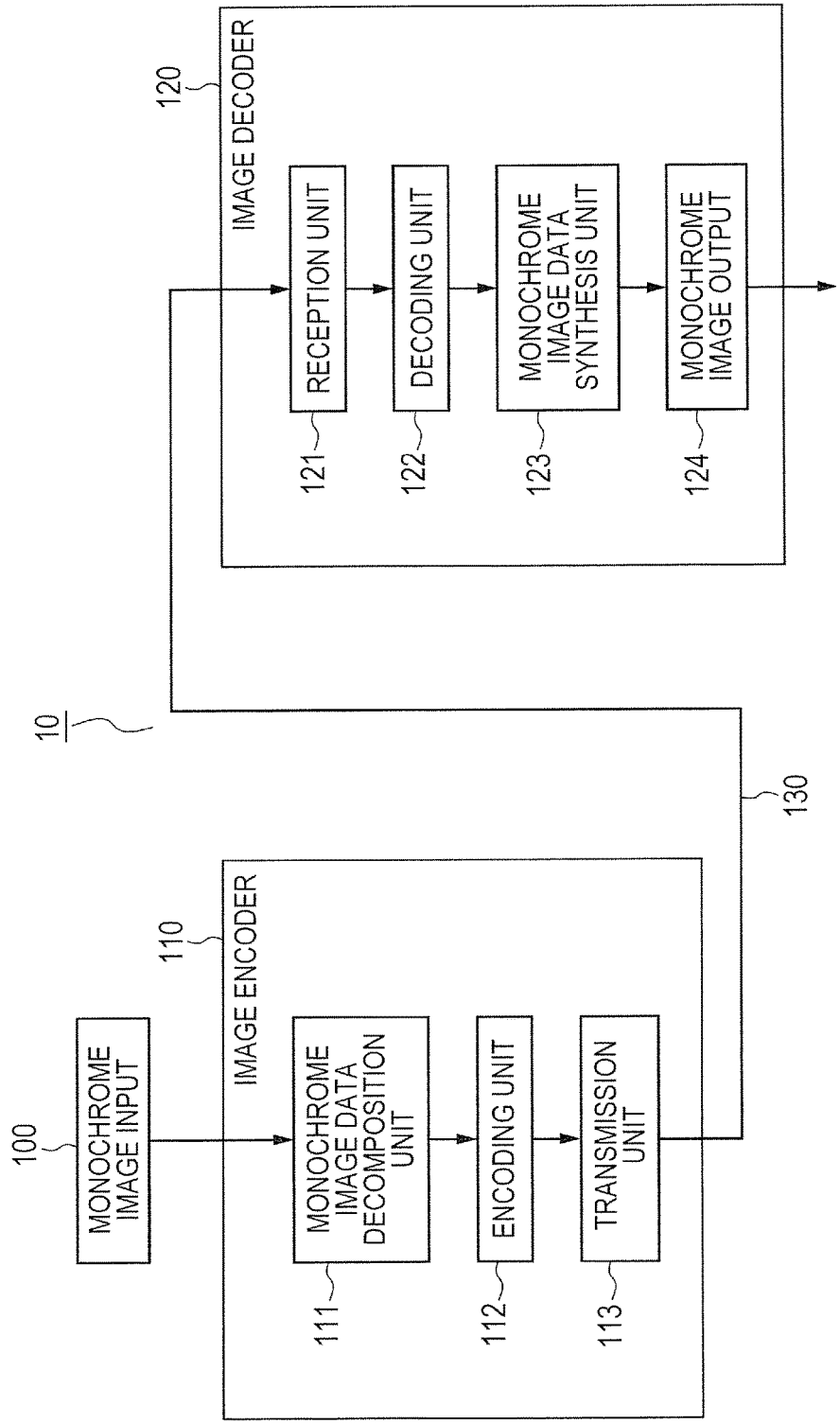
FIG. 1 is a block diagram illustrating a configuration of an image transmission device using an image encoder and an image decoder according to a first embodiment of the present invention.

Embodiments of the present invention will be described in detail below. In all drawings referred to below in describing the embodiments of the present invention, like elements are denoted by like reference numerals, and duplicate descriptions of such like elements will be omitted.

First Embodiment

FIG. 1 is a block diagram illustrating a configuration of an image transmission device 10 using an image encoder 110 and an image decoder 120 according to a first embodiment of the present invention. The image transmission device 10 includes the image encoder 110 to receive a monochrome image input 100 comprised of high bit-depth image data, and the image decoder 120. The image encoder 110 and the image decoder 120 are coupled via a transmission path 130.

The image encoder 110 includes a monochrome image data decomposition unit 111, a encoding unit 112, and a transmission unit 113. The encoding unit 112 has an image encoding function for application to a color image of a general-purpose standard bit depth. The standard bit depth is, for example, 8 bits, and a color image inputted to the encoding unit 112 is comprised of, for example, an 8-bit luminance signal Y and color difference signals Cb and Cr (UV) of 8 bits each. The monochrome image input 100 is comprised of higher bit-depth image data, i.e. image data of more bits, for example, 10 bits, 12 bits or 16 bits.

The monochrome image data decomposition unit 111 decomposes the monochrome image input 100 that is comprised of more bits than the standard bit depth into plural bit planes of the standard bit depth. The plural bit planes generated by decomposition are encoded into a color image by the encoding unit 112. The encoded data is transmitted from the transmission unit 113 to the image decoder 120 via the transmission path 130.

The image decoder 120 includes a reception unit 121, a decoding unit 122, and a monochrome image data synthesis unit 123. The decoding unit 122 has an image decoding function for application to a color image of a general-purpose standard bit depth. The standard bit depth is the same as the standard bit depth of the color image inputted to the above encoding unit 112, for example, 8 bits. The decoding unit 122 corresponds to the encoding unit 112 included in the image encoder 110 and can decode the encoded data outputted from the encoding unit 112.

The image decoder 120 receives, at the reception unit 121, the encoded data inputted via the transmission path 130 and supplies the received encoded data to the decoding unit 122. The decoding unit 122 decodes the received data into encoded color image data and, thereby, obtains luminance signal data and color difference signal data. The monochrome image data synthesis unit 123 generates a monochrome image output 124. For this, the monochrome image data synthesis unit 123 associates the luminance signal data and color difference signal data outputted from the decoding unit 122 with the plural bit planes that are generated by decomposition performed by the monochrome image data decomposition unit 111 and synthesizes, through a process which is a reversal of the decomposition process, the luminance signal data and color difference signal data into high bit-depth monochrome image data.

As described above, the encoding unit 112 included in the image encoder 110 and the decoding unit 122 included in the image decoder 120 contain mutually corresponding encoding and decoding algorithms, respectively. Similarly, it is necessary that the decomposition method used in the monochrome image data decomposition unit 111 to decompose a high bit-depth monochrome image data into plural bit planes and the synthesis method used in the monochrome image data synthesis unit 123 to synthesize the plural bit planes into high bit-depth monochrome image data correspond to each other. Namely, unless the method used in the image encoder 110 to decompose the monochrome data is known to the image decoder 120, the image decoder 120 cannot synthesize a correct high bit-depth monochrome image. Hence, a predetermined method for monochrome image decomposition is used. Alternatively, sending relevant monochrome image decomposition information from the transmission unit 113 of the image encoder 110 to the image decoder 120 makes the image decoder 120 compatible with an optional method for monochrome image data decomposition. In this way, after the image encoder 110 and the image decoder 120 are coupled to each other, correspondence can be established between the data decomposition method and the data synthesis method to be used.

The monochrome image data decomposition unit 111 and the monochrome image data synthesis unit 123 and also the encoding unit 112 and the decoding unit 122 can be realized either by hardware means or by software means. The transmission path 130 is a network which may be either wired or wireless. It may be a vehicle-mounted network such as a CAN (Controller Area Network) or FlexRay (registered trademark). It may also be a USB (Universal Serial Bus) or Ethernet (registered trademark) or wireless LAN (Local Area Network). Alternatively, the transmission path 130 may be a unidirectional transmission path like those used for broadcasting or may be one for transmission via a recording medium like a DVD (Digital Versatile Disc) or Blur-Ray (registered trademark).

Thus, an image transmission device capable of transmitting/receiving high bit-depth monochrome images can be configured by making effective use of an image encoder and an image decoder for processing color images of a general-purpose standard bit depth. Namely, widely used 8-bit color image encoders and decoders or designs of such encoders and decoders can be effectively utilized. Also, compared with existing techniques, power consumption and processing delays can be reduced.

<Method of Monochrome Image Data Decomposition>

A method of decomposing monochrome image data of a high bit depth into plural bit planes and handling the plural bit planes as color image components as done in the monochrome image data decomposition unit 111 will be described below.

FIG. 2 illustrates a first method of decomposing monochrome image data of 12-bit gradation into color image components in YUV 444 format of 8-bit gradation. A bit plane 2011 comprised of the high-order 8 bits of monochrome image data 200 is handled as a luminance component Y. A bit plane 2012 comprised of the high-order 8 bits of the monochrome image data 200 after being shifted left by 2 bits and a bit plane 2013 comprised of the high-order 8 bits of the monochrome image data 200 after being shifted left by 4 bits are handled as color difference components Cb and Cr (UV), respectively.

FIG. 3 illustrates a second method of decomposing monochrome image data of 12-bit gradation into color image components in YUV 444 format of 8-bit gradation. Like in the case illustrated in FIG. 2, a bit plane 2021 comprised of the high-order 8 bits of the monochrome image data 200 is handled as a luminance component Y. A bit plane 2022 comprised of the high-order 8 bits of the monochrome image data 200 after being shifted left by 6 bits and a bit plane 2023 comprised of the high-order 8 bits of the monochrome image data 200 after being shifted left by 9 bits are handled as color difference components Cb and Cr (UV), respectively.

FIG. 4 illustrates a third method of decomposing monochrome image data of 12-bit gradation into color image components in YUV 444 format of 8-bit gradation. Like in the case illustrated in FIG. 2, a bit plane 2031 comprised of the high-order 8 bits of the monochrome image data 200 is handled as a luminance component Y. Bit planes 2032 and 2033 generated by separating the monochrome image data 200 shifted left by 6 bits into odd-number bits and even-number bits, respectively, are handled as color difference components Cb and Cr (UV), respectively.

In all the above methods of decomposition described with reference to FIGS. 2, 3, and 4, the high-order 8 bits of monochrome image data are extracted as a luminance component Y. The color difference components Cb and Cr (UV) can be composed such that the bit data not extracted as the luminance component Y are included. Namely, they can be composed by extracting the high-order or low-order 8 bits of the monochrome image data after being shifted left by respectively different optional numbers of bits or, alternatively, by extracting the high-order or low-order 8 bits of the monochrome image data after being shifted left as described above and then separated into even-numbered bits and odd-numbered bits. Thus, the bit planes may respectively be comprised of optionally selected bits of the monochrome image data. With the luminance component Y comprised of the high-order 8 bits of the monochrome image data as shown in FIGS. 2, 3 and 4, when an encoding/decoding algorithm used is irreversible and generates some errors, the errors included in the monochrome image output 124 synthesized at the image decoder 120 can be held small.

The high bit-depth monochrome image input 100 is applicable also when the monochrome image data is not of 12-bit gradation. Methods of decomposing input monochrome image data 210 of 16-bit gradation into color image components in YUV 444 format of 8-bit gradation will be described below with reference to FIGS. 5, 6 and 7.

FIG. 5 illustrates a first method of decomposing monochrome image data of 16-bit gradation into color image components in YUV 444 format of 8-bit gradation. A bit plane 2111 comprised of the high-order 8 bits of 16-bit gradation monochrome image data 210 is handled as a luminance component Y. A bit plane 2112 comprised of the high-order 8 bits of the monochrome image data 210 after being shifted left by 4 bits and a bit plane 2113 comprised of the high-order 8 bits of the monochrome image data 210 after being shifted left by 8 bits are handled as color difference components Cb and Cr (UV), respectively.

FIG. 6 illustrates a second method of decomposing monochrome image data of 16-bit gradation into color image components in YUV 444 format of 8-bit gradation. Like in the case illustrated in FIG. 5, a bit plane 2121 comprised of the high-order 8 bits of the monochrome image data 210 is handled as a luminance component Y. A bit plane 2122 comprised of the high-order 8 bits of the monochrome image data 210 after being shifted left by 6 bits and a bit plane 2123 comprised of the high-order 8 bits of the monochrome image data 210 after being shifted left by 11 bits are handled as color difference components Cb and Cr (UV), respectively.

FIG. 7 illustrates a third method of decomposing monochrome image data of 16-bit gradation into color image components in YUV 444 format of 8-bit gradation. Like in the case illustrated in FIG. 5, a bit plane 2131 comprised of the high-order 8 bits of the monochrome image data 210 is handled as a luminance component Y. Bit planes 2132 and 2133 generated by separating the monochrome image data 210 shifted left by 6 bits into odd-number bits and even-number bits, respectively, are handled as color difference components Cb and Cr (UV), respectively.

As described above, bit planes can be comprised of optional bits of monochrome image data. Further modification examples will be described below to which the present invention is not limited.

FIG. 8 illustrates a method of decomposing monochrome image data of 12-bit gradation into 8-bit gradation color image components, i.e. a luminance Y and a color difference component U (Cb). In this example, of the general color difference components U (Cb) and V (Cr), only the U (Cb) is used. Like in the cases illustrated in FIGS. 2, 3 and 4, a bit plane 2041 comprised of the high-order 8 bits of monochrome image data 200 is handled as a luminance component Y. A bit plane 2042 comprised of the high-order 8 bits of the monochrome image data 200 after being shifted left by 4 bits is handled as a color difference component Cb (U). In this example, the other color difference component Cr (V) is not used.

FIG. 9 illustrates another method (0's are padded to the high order side of a luminance Y) of decomposing monochrome image data of 12-bit gradation into color image components in YUV444 format of 8-bit gradation. Unlike in the cases illustrated in FIGS. 2, 3 and 4, a bit plane 2051 comprised of the high-order 6 bits of the monochrome image data 200 after being shifted right by two bits and the additional two "0" bits padded to the high-order side of the high-order 6 bits is handled as a luminance component Y. A bit plane 2052 comprised of the high-order 8 bits of the monochrome image data 200 after being shifted left by one bit is handled as a color difference component Cb (U). No bit plane is allocated to the other color difference component Cr (V).

The bit depth of high bit-depth monochrome images that can be used in the present embodiment is three times the bit depth that can be processed by a codec when the YUV444 format is used or two times the bit depth that can be processed by a codec when the YUV422 format is used or 1.5 times the bit depth that can be processed by a codec when the YUV420 format is used. A method of decomposing input monochrome image data of 12-bit gradation into color image components (in YUV422 format) of 8-bit gradation will be described with reference to FIG. 10. Also, a method of decomposing input monochrome image data of 12-bit gradation into color image components (in YUV420 format) of 8-bit gradation will be described with reference to FIG. 11.

FIG. 10 illustrates a method of decomposing monochrome image data of 12-bit gradation into color image components in YUV422 format. In YUV422 format, only one each of color difference components Cb and Cr are provided for every two pixels, so that high bit-depth monochrome image data of one pixel is decomposed into one piece of 8-bit gradation luminance data and one piece of 8-bit gradation color difference data. As shown in FIG. 10, a bit plane 2061 comprised of the high-order 8 bits of 12-bit gradation monochrome image data (Y1) of a pixel is handled as a luminance component Y1, and a bit plane 2062 comprised of the low-order 8 bits of the monochrome image data (Y1) 200 after being shifted left by 4 bits is handled as a color difference component Cb (U). A bit plane 2063 comprised of the high-order 8 bits of 12-bit gradation monochrome image data (Y2) 201 of the next pixel is handled as a luminance component Y2, and a bit plane 2064 comprised of the low-order 8 bits of the monochrome image data (Y2) 201 after being shifted left by 4 bits is handled as a color difference component Cr (V).

Figure 11:
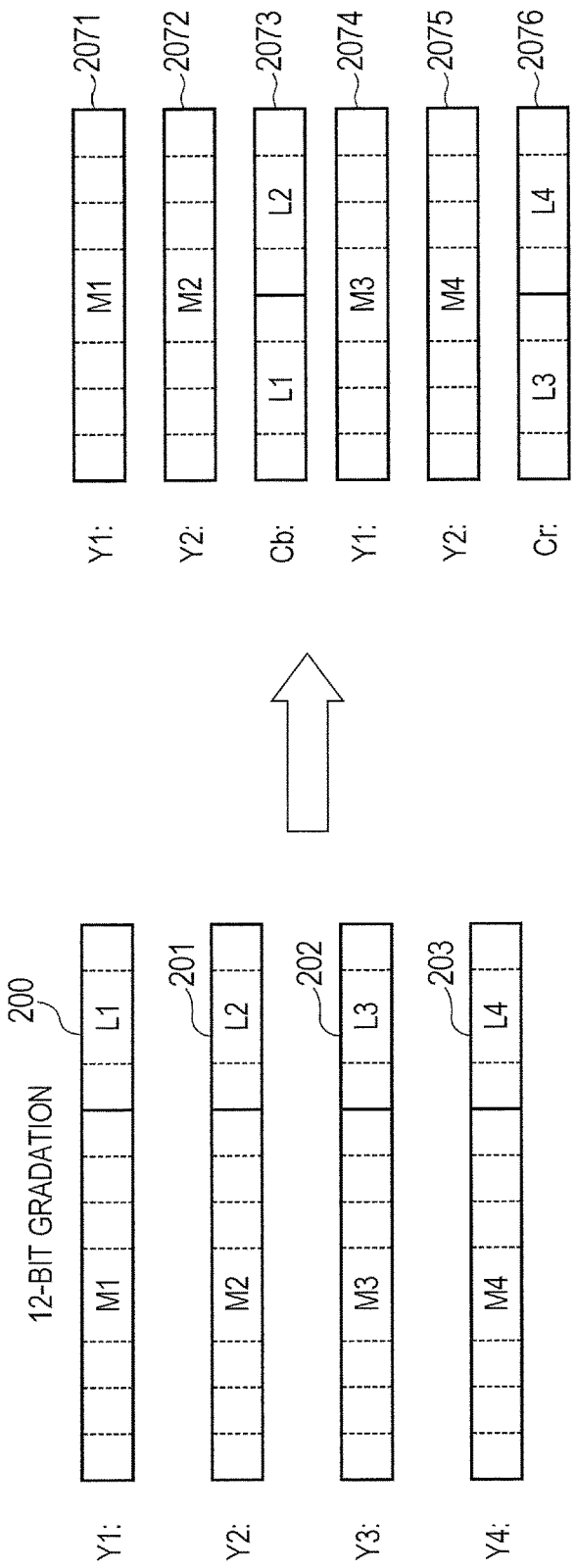
FIG. 11 illustrates a method of decomposing monochrome image data of 12-bit gradation into color image components in YUV420 format.

FIG. 11 illustrates a method of decomposing monochrome image data of 12-bit gradation into color image components in YUV420 format. In YUV420 format, only one each of color difference components Cb and Cr are provided for every four pixels. Therefore, the bit planes to be handled as color difference components are comprised of combinations of low-order bits of a high bit-depth monochrome image left after extraction of higher-order bits to compose a bit plane to be handled as a luminance component. Bit planes 2071, 2072, 2074 and 2075 comprised of the high-order 8 bits of 12-bit gradation monochrome image data (Y1 to Y4) 200 to 203 of four pixels are handled as luminance components Y1 to Y4 of 8-bit gradation. Of the low-order 4 bits L1 to low-order 4 bits L4 of the monochrome image data of four pixels (Y1 to Y4) 200 to 203, the low-order 4 bits L1 are handled as the high-order 4 bits of a bit plane 2073 and the low-order 4 bits L2 are handled as the low-order 4 bits of the bit plane 2073. The bit plane 2073 is handled as a color difference component Cb. Also, the low-order 4 bits L3 are handled as the high-order 4 bits of a bit plane 2076 and the low-order 4 bits L4 are handled as the low-order 4 bits of the bit plane 2076. The bit plane 2076 is handled as a color difference component Cr. This way of composing the bit planes to be handled as color difference components Cb and Cr represents only an optional example method. For example, the relationship between L3 and L4 may be reversed, and the combination of L1 to L4 is optionally alterable. Furthermore, the bits extracted from the respective monochrome image data may be included in the bit planes after separation into odd-number bits and even-number bits.

<Method of Monochrome Image Data Synthesis>

A method of synthesizing monochrome image data in the monochrome image data synthesis unit 123 will be described below. The monochrome image data synthesis unit 123 receives, as color image data, decoded color image components. From the received color image components, plural bit planes are re-composed and, from the plural bit planes, high bit-depth monochrome image data is synthesized. Which bits are to be used for monochrome image data synthesis from the bit planes obtained in the decoding unit 122 is to be determined beforehand and necessary arrangement is to be made in the monochrome image data decomposition unit 111 and monochrome image synthesis unit 123, or alternatively, necessary setting is to be made beforehand using appropriate communication means.

Figure 12:
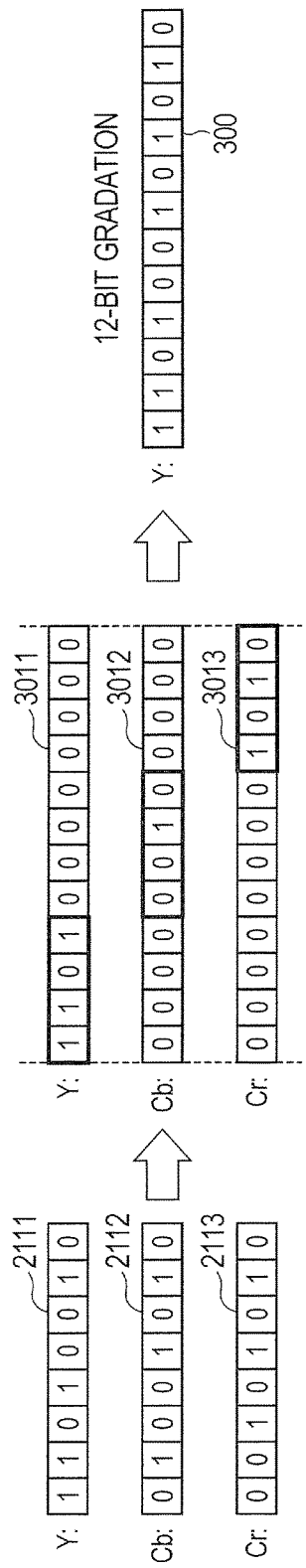
FIG. 12 illustrates a first method of synthesizing 12-bit gradation monochrome image data from 8-bit gradation color image components in YUV 444 format.

FIG. 12 illustrates a first method of synthesizing 12-bit gradation monochrome image data from 8-bit gradation color image components in YUV 444 format. In the image encoder 110, monochrome image data is decomposed by a method corresponding to the method illustrated in FIG. 2. A bit plane 3011 is generated by masking the low-order 4 bits of the luminance Y component, then shifting the luminance Y component left by 4 bits. A bit plane 3012 is generated by masking the low-order 2 bits and high-order 2 bits of the color difference Cb component, then shifting the color difference Cb component left by 2 bits. A bit plane 3013 is generated by masking the high-order 4 bits of the color difference Cr component. A 12-bit gradation monochrome image 300 is generated by adding the bit planes 3011, 3012 and 3013 thus generated together.

Figure 13:
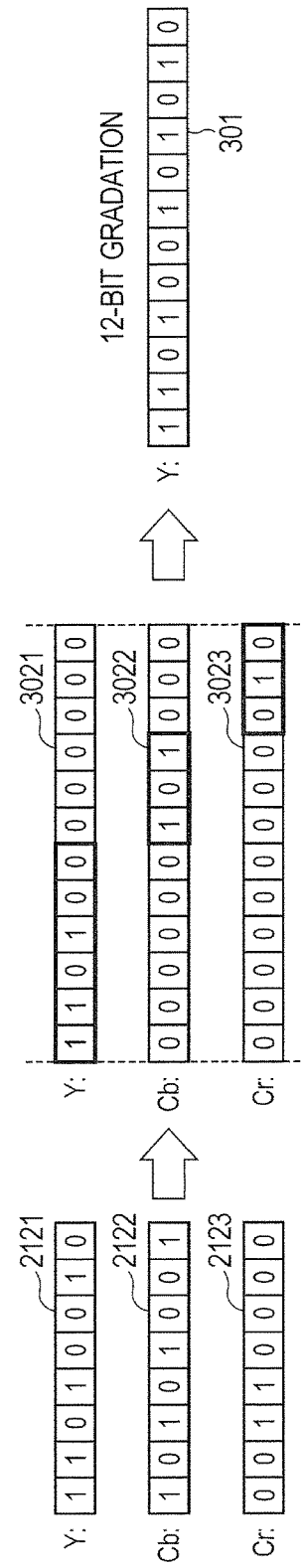
FIG. 13 illustrates a second method of synthesizing 12-bit gradation monochrome image data from 8-bit gradation color image components in YUV 444 format.

FIG. 13 illustrates a second method of synthesizing 12-bit gradation monochrome image data from 8-bit gradation color image components in YUV 444 format. In the image encoder 110, monochrome image data is decomposed by a method corresponding to the method illustrated in FIG. 3. A bit plane 3021 is generated by masking the low-order 4 bits of the luminance Y component, then shifting the luminance Y component left by 4 bits. A bit plane 3022 is generated by masking the low-order 5 bits of the Cb component, then shifting the Cb component right by 2 bits. A bit plane 3023 is generated by masking the low-order 5 bits of the Cr component, then shifting the Cr component right by 5 bits. A 12-bit gradation monochrome image 301 is generated by adding the bit planes 3021, 3022 and 3023 thus generated together.

FIG. 14 illustrates a third method of synthesizing 12-bit gradation monochrome image data from 8-bit gradation color image components in YUV 444 format. In the image encoder 110, monochrome image data is decomposed by a method corresponding to the method illustrated in FIG. 4. A bit plane 3031 is generated by masking the low-order 4 bits of the Y component, then shifting the Y component left by 4 bits. A bit plane 3032 is generated by masking the low-order 5 bits of the Cb component, then shifting the high-order 3 bits left by 1 bit, then shifting the high-order 2 bits left by 1 bit, then shifting the highest-order bit left by 1 bit. A bit plane 3033 is generated by masking the low-order 5 bits of the Cr component, then shifting the high-order 2 bits left by 1 bit, then shifting the highest-order bit left by 1 bit. A 12-bit gradation monochrome image 302 is generated by adding the bit planes 3031, 3032 and 3033 thus generated together.

FIG. 15 illustrates a first method of synthesizing 16-bit gradation monochrome image data from 8-bit gradation color image components in YUV 444 format. In the image encoder 110, monochrome image data is decomposed by a method corresponding to the method illustrated in FIG. 5. A bit plane 3111 is generated by masking the low-order 2 bits of the Y component, then shifting the Y component left by 8 bits. A bit plane 3112 is generated by masking the low-order 1 bit of the Cb component, then shifting the Cb component right by 2 bits. A bit plane 3113 is generated by masking the high-order 3 bits of the Cr component. A 16-bit gradation monochrome image 310 is generated by adding the bit planes 3111, 3112 and 3113 thus generated together.

FIG. 16 illustrates a second method of synthesizing 16-bit gradation monochrome image data from 8-bit gradation color image components in YUV 444 format. In the image encoder 110, monochrome image data is decomposed by a method corresponding to the method illustrated in FIG. 5. A bit plane 3121 is generated by masking the low-order 2 bits of the Y component, then shifting the Y component left by 8 bits. A bit plane 3122 is generated by masking the low-order 3 bits of the Cb component, then shifting the Cb component right by 2 bits. A bit plane 3123 is generated by shifting the Cr component right by 3 bits. A 16-bit gradation monochrome image 311 is generated by adding the bit planes 3121, 3122 and 3123 thus generated together.

FIG. 17 illustrates a third method of synthesizing 16-bit gradation monochrome image data from 8-bit gradation color image components in YUV 444 format. In the image encoder 110, monochrome image data is decomposed by a method corresponding to the method illustrated in FIG. 7. A bit plane 3131 is generated by masking the low-order 2 bits of the Y component, then shifting the Y component left by 8 bits. A bit plane 3132 is generated by masking the low-order 3 bits of the Cb component, then shifting the high-order 5 bits left by 1 bit, then shifting the high-order 4 bits left by 1 bit, then shifting the high order 3 bits left by 1 bit, then shifting the high-order 2 bits left by 1 bit, and finally shifting the highest-order bit left by 1 bit. A bit plane 3133 is generated by masking the low-order 5 bits of the Cr component, then shifting the high-order 4 bits left by 1 bit, then shifting the high-order 3 bits left by 1 bit, then shifting the high-order 2 bits left by 1 bit, and finally shifting the highest-order bit left by 1 bit. A 16-bit gradation monochrome image 312 is generated by adding the bit planes 3131, 3132 and 3133 thus generated together.

FIG. 18 illustrates a method of synthesizing 12-bit gradation monochrome image data from 8-bit gradation color image components, i.e. a luminance Y and a color difference component U (Cb). In the image encoder 110, monochrome image data is decomposed by a method corresponding to the method illustrated in FIG. 8. A bit plane 3141 is generated by masking the low-order 2 bits of the Y component and shifting the Y component left by 5 bits. A bit plane 3142 is generated by masking the high-order 2 bits of the Cb component. A 12-bit gradation monochrome image 304 is generated by adding the bit planes 3141 and 3142 thus generated together.

FIG. 19 illustrates a method of synthesizing 12-bit gradation monochrome image data from 8-bit gradation color image components in YUV444 format with 0's padded to the high-order side of a luminance Y component. In the image encoder 110, monochrome image data is decomposed by a method corresponding to the method illustrated in FIG. 9. A bit plane 3151 is generated by masking the high-order 2 bits of the Y component and shifting the Y component left by 6 bits. A bit plane 3152 is generated by masking the high-order 5 bits of the Cb component and shifting the Cb component left by 3 bits. A bit plane 3153 is generated by masking the high-order 5 bits of the Cr component. A 12-bit gradation monochrome image 305 is generated by adding the bit planes 3151, 3152 and 3153 thus generated together.

Though not illustrated by drawings, high bit-depth monochrome images can be synthesized in a similar manner also in cases where the YUV422 format or YUV420 format is used.

As described above, it is possible, making use of an image encoder/decoder for processing color images of a general-purpose standard bit depth, to encode/decode a high bit-depth monochrome image and transmit the encoded/decoded image. This is realized by decomposing monochrome image data of a high bit depth into plural bit planes by an optional method and handling the plural bit planes as color image components. The image encoder/decoder for processing color images of a general-purpose standard bit depth may be, for example, an existing type of an 8-bit encoder/decoder not compatible with high bit-depth color images. Since the decomposition method is optional, a method suitable for the encoder to be used can be selected so as to reduce image quality deterioration. With an optional decomposition method adoptable, it is possible, even when the encoder/decoder to be used is not compatible with the YUV444 format, to encode/decode monochrome images of a high bit-depth and transmit the encoded/decoded images using the YUV422 or YUV420 format.

In the foregoing existing technique, after an image is encoded, the image is internally decoded, and data about differences from the original image data is obtained for re-encoding of the image. In the present embodiment, the processing delay is defined by image data encoding which can be carried out concurrently with image data decomposition into bit planes, so that an image can be encoded/decoded and transmitted without involving much delay.

Second Embodiment

Figure 20:
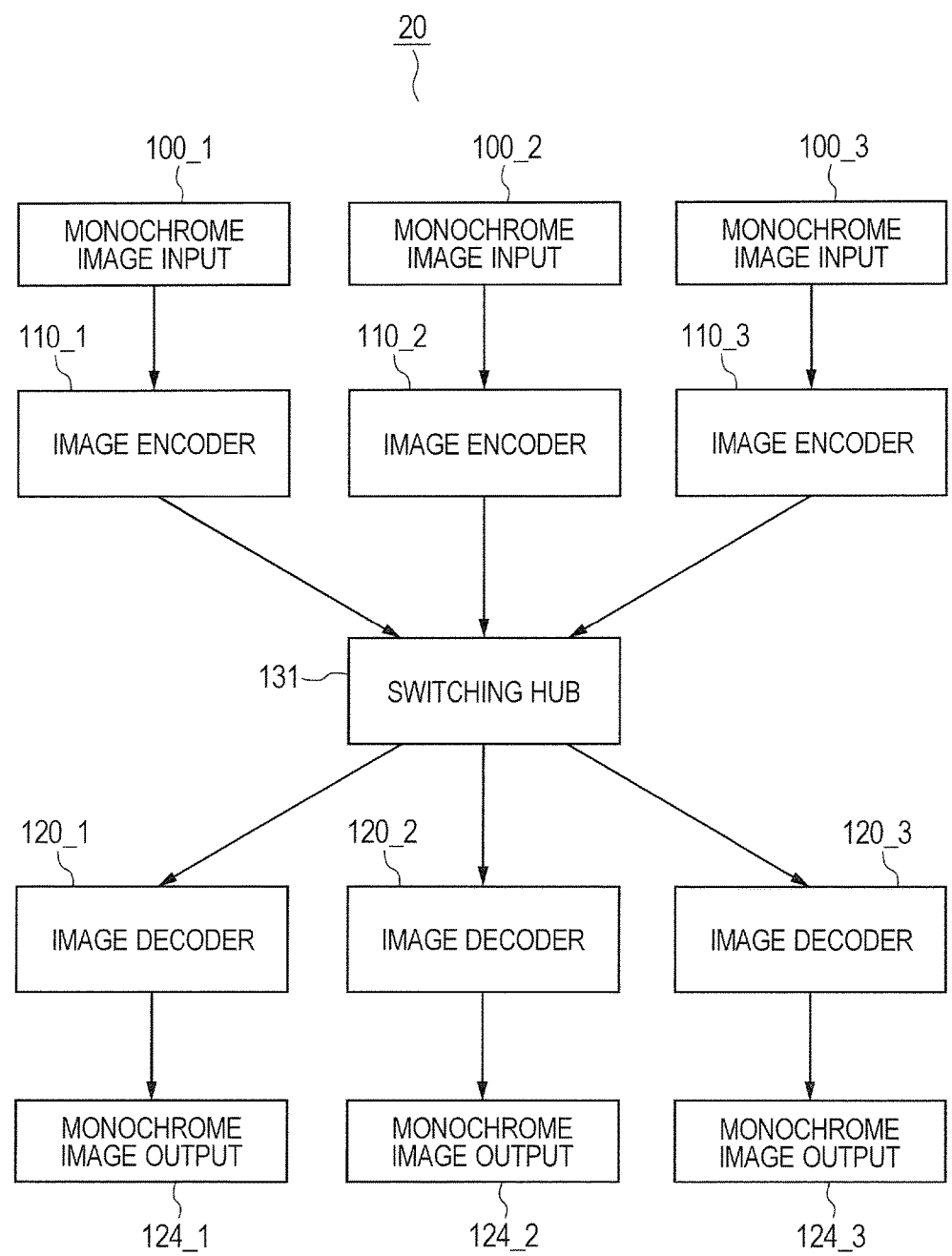
FIG. 20 is a block diagram showing an example configuration of a top view system for vehicle mounting according to a second embodiment of the present invention.

FIG. 20 is a block diagram showing an example configuration of a top view system 20 for vehicle mounting according to a second embodiment of the present invention. The top view system. 20 for vehicle mounting includes plural image encoders 110 and plural image decoders 120 as used in the first embodiment. In the top view system 20 for vehicle mounting shown in FIG. 20, three image encoders 110_1 to 110_3 and three image decoders 120_1 to 120_3 are mutually coupled via a switching hub 131. Encoded data can be transmitted via the switching hub 131. The three image encoders 110_1 to 110_3 receive high bit-depth monochrome image inputs 100_1 to 100_3, respectively. The three image decoders 120_1 to 120_3 deliver high bit-depth monochrome image outputs 124_1 to 124_3, respectively. The image encoders 110_1 to 110_3 and the image decoders 120_1 to 120_3 each operate as described in connection with the first embodiment, so that their description will not be repeated herein.

The high bit-depth monochrome image inputs 100_1 to 100_3 are two-dimensional distance information representing a distance, for example, to an obstacle (target object) forward or leftward/rightward of the vehicle. The monochrome image outputs 124_1 to 124_3 are image data outputted after being encoded, transmitted and decoded and are re-arranged into information to represent positional relationship between the vehicle and an obstacle as seen from above.

Namely, the high bit-depth monochrome images used in the first and second embodiments are not necessarily limited to visual images. The monochrome images are only required to be data having numerical values for positions corresponding to pixels arranged in a frame like a two-dimensional image.

Though, in the second embodiment, three image encoders 110_1 to 110_3 and three image decoders 120_1 to 120_3 are used, the number of the image encoders and image decoders are optional. Also, an alternative configuration may be used in which a pair of image encoder 110 and image decoder 120 encode, transmit and decode plural monochrome image inputs 100_1 to 100_x sequentially.

The invention made by the present inventors has been described in concrete terms based on embodiments. However, the present invention is not limited to the embodiments and can be modified in various ways without departing from the scope of the invention.

For example, though the above embodiments have been described based on the assumption that an 8-bit depth is a general-purpose standard bit depth of color images, an image encoder and an image decoder for processing color images of a different bit depth may also be used. Also, processing of high bit-depth monochrome images of 12-bit and 16-bit gradations have been described, but the respective embodiments can be modified to process monochrome images of different bit depths. Furthermore, what are referred to as "images" in the present specification are not necessarily limited to visual images. For example, the foregoing embodiments are widely applicable also to data which, having numerical values for individual pixels, can be handled as images.

What is claimed is:

1. An image transmission device, comprising:
    an image encoding device configured to encode an N-bit gradation monochrome image received as input data, N being a positive integer, and output an M-bit color image data as encoded data, M being a positive integer smaller than N; and
    an image decoding device configured to generate, by decoding the M-bit color image data received via a transmission path, an N-bit gradation monochrome image as output data,
    wherein the image encoding device includes a data decomposition circuit and an encoding circuit,
    wherein the decomposition circuit decomposes the N-bit gradation monochrome image received as input data into M-bit gradation color image components by generating corresponding plural bit planes,
    wherein the encoding circuit generates the M-bit color image data from the plural bit planes,
    wherein the image decoding device includes a decoding circuit and a data synthesis circuit,
    wherein the decoding circuit is configured to divide the M-bit color image data into color image components, and
    wherein the data synthesis circuit is configured to re-compose the plural bit planes from the color image components and generate an N-bit gradation monochrome image as the output data from the re-composed plural bit planes.

2. The image transmission device according to claim 1, wherein the color image data includes an M-bit luminance component, M being 8.

3. The image transmission device according to claim 2,
    wherein the data decomposition circuit generates a bit plane of high-order 8 bits of the input data, the bit plane corresponding to the luminance component of the color image data, and
    wherein the data synthesis circuit generates, from the luminance component of the color image data decoded by the decoding circuit, high-order 8 bits of the output data.

4. The image transmission device according to claim 1, wherein a correspondence between the bit planes generated from the input data in the data decomposition circuit and the color image data in the encoding circuit is the same as a correspondence between the bit planes making up the output data in the data synthesis circuit and the color image data in the decoding circuit.

5. The image transmission device according to claim 4,
    wherein information about the correspondence between the bit planes generated from the input data in the data decomposition circuit and the color image data in the encoding circuit is transmitted from the image encoder to the image decoder, and
    wherein, in the image decoder, the correspondence between the bit planes making up the output data in the data synthesis circuit and the color image data in the decoding circuit is set based on the transmitted information.

6. The image transmission device according to claim 1, wherein the monochrome image is two-dimensional distance information representing a distance between a viewer's eye and a target object.

7. An image encoding device to encode an N-bit gradation monochrome image received as input data and output an M-bit color image data as an encoded data, N being a positive integer, and M being a positive integer smaller than N, the image encoding device comprising:
    a data decomposition circuit; and
    an encoding circuit,
    wherein the decomposition circuit decomposes the N-bit gradation monochrome image received as input data into M-bit gradation color image components by generating corresponding plural bit planes, and
    wherein the encoding circuit generates the M-bit color image data from the plural bit planes.

8. The image encoding device according to claim 7, wherein the color image data includes an M-bit luminance component, M being 8.

9. The image encoding device according to claim 8, wherein the data decomposition circuit generates a bit plane of high-order 8 bits of the input data, the bit plane corresponding to the luminance component of the color image data.

10. The image encoding device according to claim 7, wherein the image encoding device is configured to transmit information about correspondence between the bit planes generated from the input data in the data decomposition circuit and the color image data in the encoding circuit.

11. The image encoding device according to claim 7, wherein the monochrome image is two-dimensional distance information representing a distance between a viewer's eye and a target object.

12. An image decoding device to generate an N-bit gradation monochrome image as output data by decoding an M-bit color image data received as encoded data via a transmission path, N being a positive integer, and M being a positive integer smaller than N, the encoded data representing an input N-bit gradation monochrome image that has been encoded, the image decoding device comprising:
    a decoding circuit configured to decompose the M-bit color image data into color image components by image decoding processing; and
    a data synthesis circuit configured to generate plural bit planes from the color image components and configured to generate an N-bit gradation monochrome image as the output data from the generated plural bit planes.

13. The image decoding device according to claim 12, wherein the color image data includes an M-bit luminance component, M being 8.

14. The image decoding device according to claim 13,
    wherein the encoded data includes a bit plane including high-order 8 bits of the input data which corresponds to a luminance component of the color image data, and wherein the data synthesis circuit generates high-order 8 bits of the output data from the luminance component of the color image data decoded by the decoding circuit.

15. The image decoding device according to claim 12, wherein a correspondence between the plural bit planes making up the output data in the data synthesis circuit and the color image data in the decoding circuit is set based on a correspondence between bit planes generated from the input data and the color image data processed during image encoding.

16. The image decoding device according to claim 12, wherein the N-bit gradation monochrome image is two-dimensional distance information representing a distance between an observer's eye and a target object.

* * * * *